(12) United States Patent
Huang et al.

(10) Patent No.: US 6,513,251 B2
(45) Date of Patent: Feb. 4, 2003

(54) ILLUMINABLE LASER SIGHT

(75) Inventors: Chao-Chi Huang, Taipei (TW); Wan-Rone Liou, Tainan (TW); Chih-Feng Lin, Taipei (TW); Yu-Hsi Yang, Taipei (TW)

(73) Assignee: Quarton, Inc. (TW)

( * ) Notice: Subject to any disclaimer, the term of this patent is extended or adjusted under 35 U.S.C. 154(b) by 0 days.

(21) Appl. No.: 09/759,807

(22) Filed: Jan. 11, 2001

(65) Prior Publication Data

US 2002/0088129 A1 Jul. 11, 2002

(51) Int. Cl.⁷ .............................. F41G 1/34; H01S 3/00
(52) U.S. Cl. .................. 33/286; 33/DIG. 21; 430/945; 372/1; 42/111; 362/110
(58) Field of Search ......................... 33/DIG. 21, 286; 430/945; 372/1; 42/113, 114, 115, 117, 146, 148, 111, 123; 362/110, 231, 259, 228, 234; 385/147, 901

(56) References Cited

U.S. PATENT DOCUMENTS

| | | | | |
|---|---|---|---|---|
| 4,172,274 A | * | 10/1979 | Zemke | 362/111 |
| 4,313,273 A | * | 2/1982 | Matthew et al. | 42/1 A |
| 4,713,889 A | * | 12/1987 | Santiago | 33/241 |
| 5,355,609 A | * | 10/1994 | Schenke | 42/103 |
| 5,425,299 A | * | 6/1995 | Teetzel | 89/14.4 |
| 5,584,137 A | * | 12/1996 | Teetzel | 42/103 |
| 5,594,254 A | * | 1/1997 | Palmer | 250/504 R |
| 6,007,218 A | * | 12/1999 | German et al. | 362/259 |
| 6,121,600 A | * | 9/2000 | Saldana et al. | 250/214 VT |
| 6,144,787 A | * | 11/2000 | Johnston et al. | 385/31 |
| 6,178,649 B1 | * | 1/2001 | Wu | 33/286 |
| 6,276,088 B1 | * | 8/2001 | Matthew et al. | 42/103 |
| 6,293,869 B1 | * | 9/2001 | Kwan et al. | 463/51 |
| 6,345,464 B1 | * | 2/2002 | Kim et al. | 42/114 |

* cited by examiner

*Primary Examiner*—Diego Gutierrez
*Assistant Examiner*—Gail Verbitsky
(74) *Attorney, Agent, or Firm*—Raymond Sun

(57) ABSTRACT

An illuminable laser sight has a power source, a laser module coupled to the power source, a laser module coupled to the power source and having a laser diode for emitting laser beams, and an adjuster module positioned around the laser module and coupled to the power source, the adjuster module having a front face and a laser light exit formed at the center of the front face and aligned with the laser diode. The laser sight further includes an illuminator module positioned adjacent the front face of the adjuster module, the illuminator module having a plurality of LEDs arranged in an annular manner to define a central bore that is axially aligned with the laser light exit and the laser diode.

20 Claims, 4 Drawing Sheets

ILLUMINABLE LASER SIGHT

BACKGROUND OF THE INVENTION

1. Field of the Invention

The present invention relates to a laser sight, in particular to a laser sight that provides an illumination effect by symmetrically positioning a plurality of LEDs around the light output of a laser.

2. Description of the Prior Art

The fact that a laser diode emits a high concentration of light allows it to be used in indication, positioning and gunshot sighting. The structure of a conventional laser sight is shown in FIGS. 1 and 2, and includes a laser box 10 that has a cover 11 having a laser diode 12 whose emitting light can be projected out through an opening 112 installed at the upper side of the laser box 10. A battery 13 is positioned below the cover 11, and can be a 3.6 volts lithium battery, with a protecting plate 114 covering the battery inside the cover 11. A flashlight rack 14 is installed below the laser box 10 to affix a flashlight 15 thereto so as to be able to do shooting at night. A clipping groove 116 is disposed at each flank side of the cover 11 of the laser box 10, each groove 116 being utilized to buckle up one end of two clipping plates 142 of the flashlight 14. A set of screws 145 can be adjusted to clamp the two clipping plates 142 tightly, enabling a flashlight 15 to be held inside the flashlight rack 14 and the two clipping plates 142 to be clamped tightly below the cover 11 of the laser box 10.

Thus, in a conventional laser sight, a flashlight is added to the outer part of the laser box 10 to provide illumination. Since the flashlight and the laser sight operate separately, there is often a lack of consistency in sighting a target during shooting. In this regard, the illumination direction of the flashlight and the aiming direction of the laser sight are not aligned, which consequently can cause a shooter to take inaccurate aims. Additionally, the conventional laser sight is not waterproof, so that bad weather or perspiration may lead to the short circuit of the laser sight.

SUMMARY OF THE INVENTION

It is an objective of the present invention to provide an illuminable laser sight.

It is another objective of the present invention to provide a laser sight having a light source positioned with respect to the laser diode in a manner so that the illumination provided by the light source is coaxial to the sight line emitted by the laser diode.

It is yet another objective of the present invention to provide an illuminable laser sight whose aiming and illumination functions may be consistently operated by actuating a single switch.

It is yet a further objective of the present invention to provide an illuminable laser sight that is waterproof.

The objectives of the present invention can be accomplished by providing an illuminable laser sight having a power source, a laser module coupled to the power source and having a laser diode for emitting laser beams, and an adjuster module positioned around the laser module and coupled to the power source, the adjuster module having a front face and a laser light exit formed at the center of the front face and aligned with the laser diode. The laser sight further includes an illuminator module positioned adjacent the front face of the adjuster module, the illuminator module having a plurality of LEDs arranged in an annular manner to define a central bore that is axially aligned with the laser light exit and the laser diode.

DETAILED DESCRIPTION OF THE PREFERRED EMBODIMENT

Figure 1:
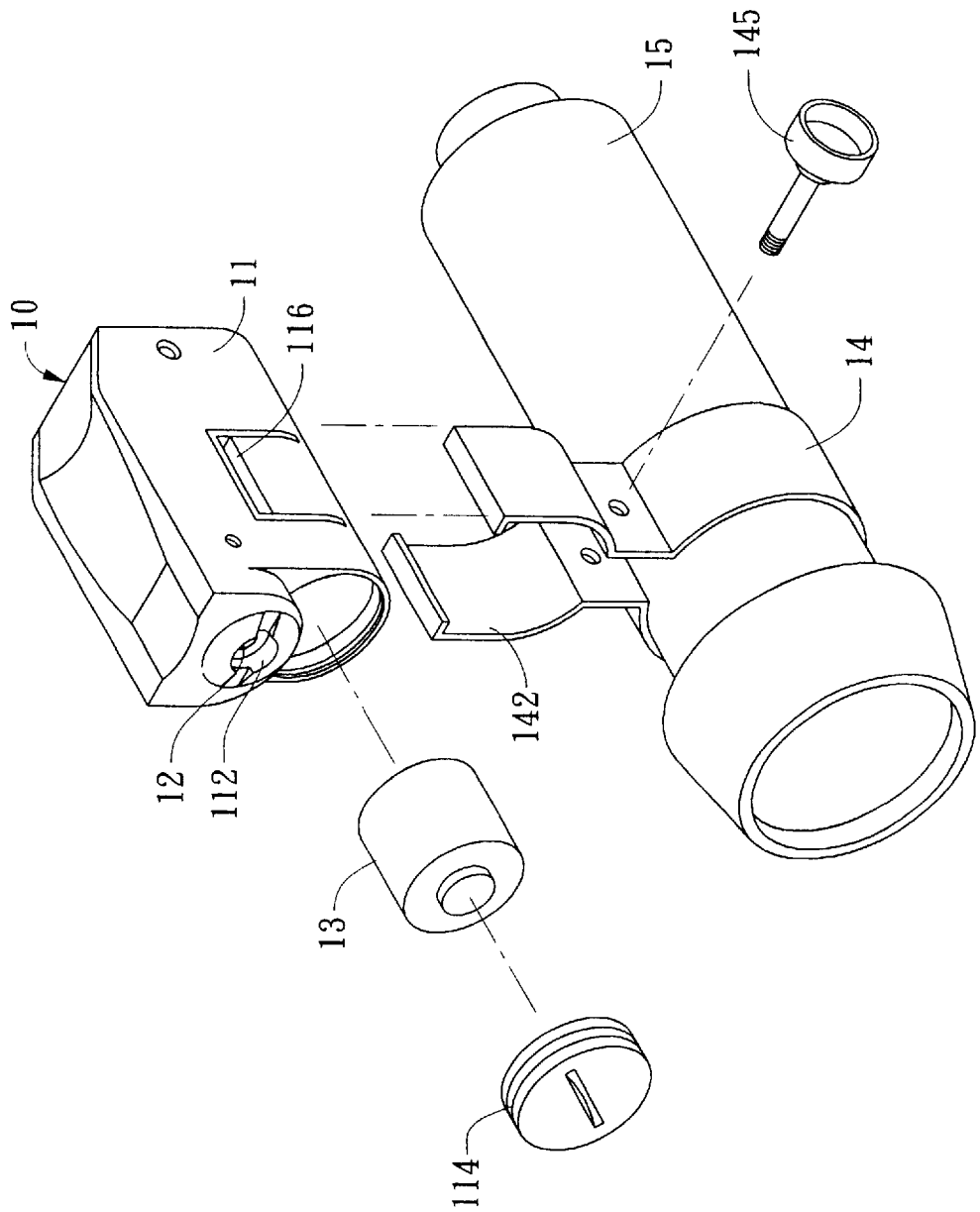
FIG. 1 is an exploded perspective view of a conventional laser sight.
Figure 2:
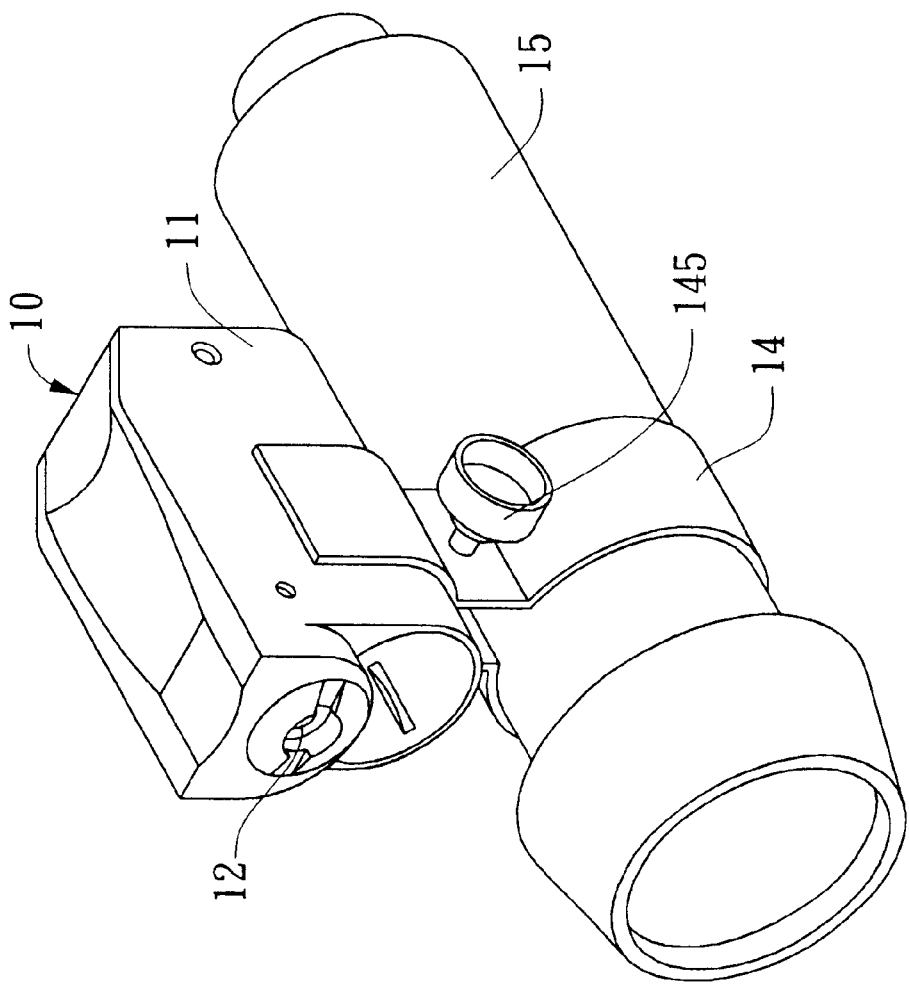
FIG. 2 is a perspective view of the conventional laser sight of FIG. 1.
Figure 3:
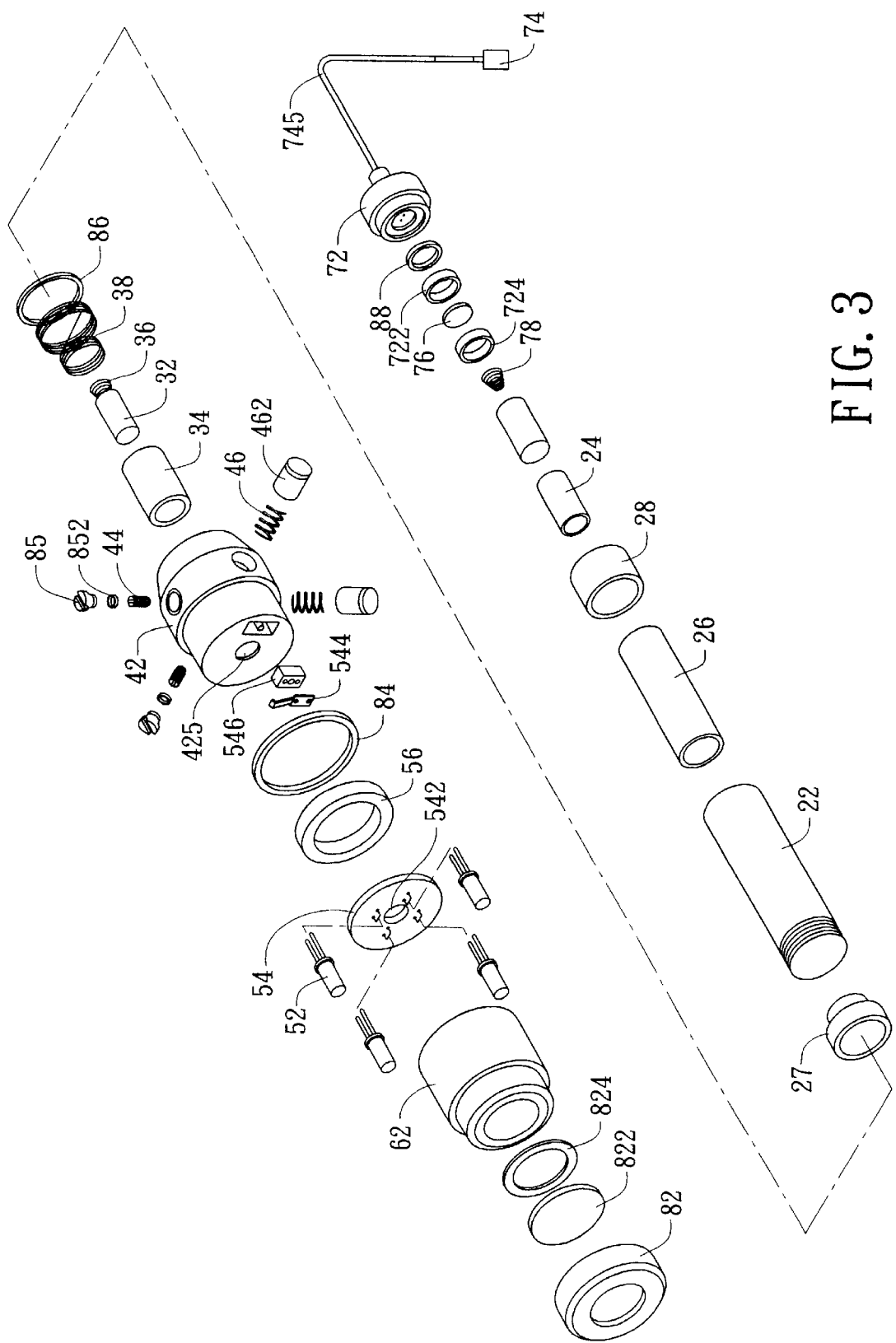
FIG. 3 is an exploded perspective view of a laser sight according to one embodiment of the present invention.
Figure 4:
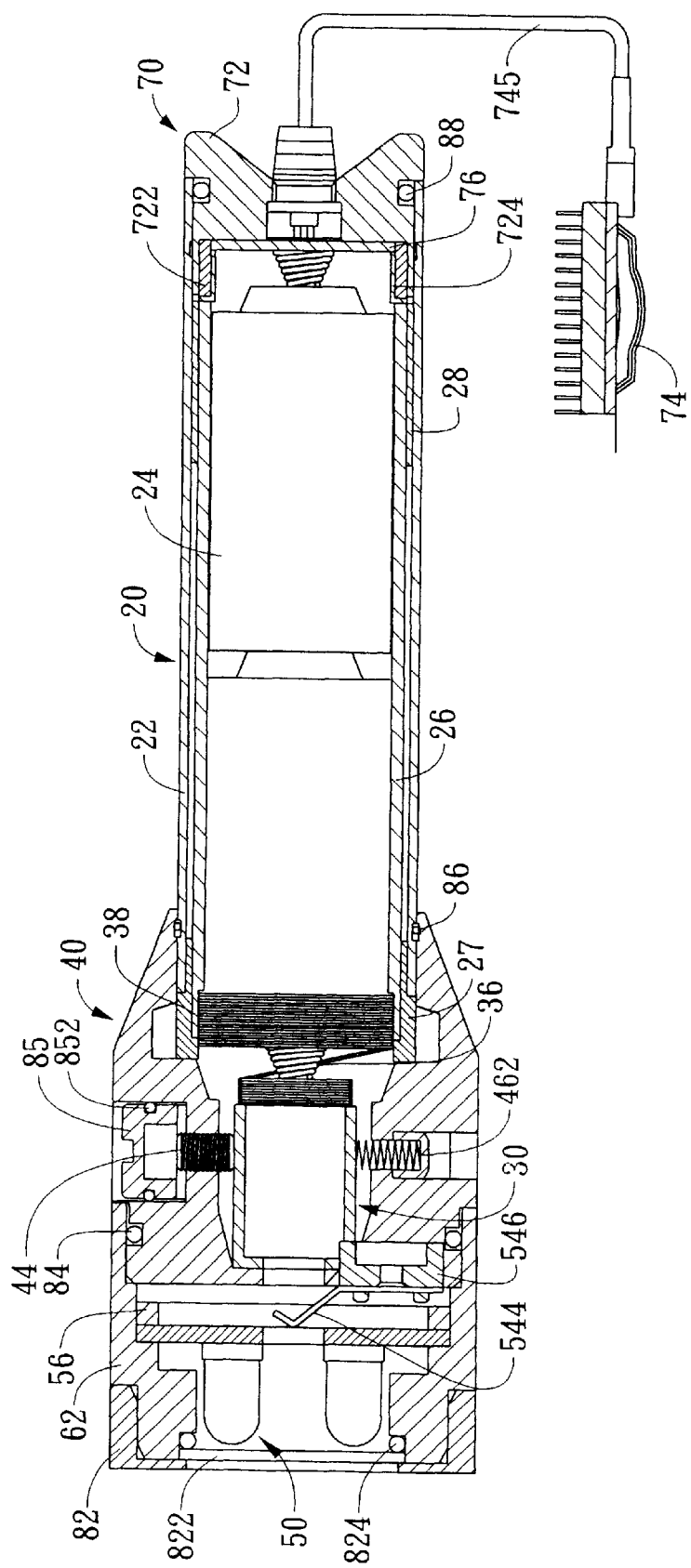
FIG. 4 is a cross-sectional view of the laser sight of FIG. 3.

FIGS. 3 and 4 illustrate a laser sight according to one embodiment of the present invention. The laser sight includes a power source 20, a laser module 30, an adjustment module 40, an illuminator module 50, a front cover 62, and a switch set 70.

The power source 20 includes a hollow cylinder 22 that is adapted to receive a battery 24 inside it to supply electricity for the laser sight. A conducting tube 26 is installed in the cylinder 22 to conduct electric current. A front sleeve 27 and a rear sleeve 28 are provided at the front and rear ends, respectively, of the cylinder 22 and the conducting tube 26 to attach and insulate them.

The laser module 30 includes a laser diode 32 that can emit a laser beam or any form of laser light, and an outer sleeve 34 fixed outside the laser diode 32. The laser diode 32 is connected to the battery 24 and the conducting tube 26 in the power source 20 via a central electrically conductive spring 36 and an outer electrically conductive spring 38, respectively. A blip can be aimed at a target as a guide for sighting upon shooting by utilizing the highly concentrated characteristics of a laser beam emitted from the laser diode 32.

The adjuster module 40 is installed outside the laser module 30, and includes an adjusting drum 42 that is secured to the front end of the power source 20, such as by a screw thread. The adjusting drum 42 has a light exit 425 formed at the center of its front face 477 for the allowing the laser beam from the laser diode 32 to be projected therethrough. Two adjusting bolts 44 spaced-apart by 90 degrees are positioned inside corresponding bores 488 in the adjusting drum 42, with two corresponding adjusting springs 46 positioned inside respective bores 489, in adjusting drum 42 at locations that are opposite to the adjusting bolts 44. In other words, the bores 488 and 489 that hold the bolts 44 and the springs 46, respectively, are each spaced apart by about 90 degrees around the outer surface of the adjusting drum 42. For example, one bolt 44 and its corresponding spring 46 occupy the zero degree and 180 degree positions, respectively, while another bolt 44 and its corresponding spring 46 occupy the 90 degree and 270 degree positions, respectively. The inner ends of the bolts 44 and springs 46 are adapted to contact the outer sleeve 34 of the laser module 30. As a result, the deviation caused by the difference between the straight line of a laser beam and the curved trajectory of a bullet may be adjusted by carefully adjusting the adjusting bolts 44 and the tensile force of the adjusting springs 46 via the respective covers 462 for the adjusting springs 46.

An illuminator module 50 is installed at the front of the adjuster module 40, and includes a plurality of high illumination LEDs 52 and a PC board 54. A central bore 542 that is axially aligned with the light exit 425 of the adjuster module 40 is disposed at the center of the PC board 54, enabling the laser beam from the laser diode 32 to project therethrough. The high illumination LEDs 52 utilize the central bore 542 of the PC board 54 as a center to be disposed symmetrically around the central bore 542, so that the LEDs 52 are properly positioned to provide a consistent and annular illumination that is coaxial to the sight line of the laser beam in order to lower the probability of target misjudgment caused by blurred vision during night shooting. Additionally, the illuminator module 50 uses a conductive spring plate 544 and a spring plate stand 546 that are secured inside a bore 499 on the front face 477 of the adjuster module 40 to provide an electrical connection with the power source 20.

Moreover, the illuminator module 50 is secured to the laser sight by mounting a front cover 62 onto the front end of the adjuster module 40 with the illuminator module 50 sandwiched therebetween, and a PC board pressing loop 56 is positioned at the rear or proximal side of the PC board 54 to better secure the PC board 54 and to prevent the PC board 54 from shifting during use. An opening 621 is provided on the front cover 62 and is aligned with the light exit 425 and the laser diode 32 to allow laser light to be emitted from the laser module 30 and illuminator module 50, and to allow the light from the LEDs 52 to be emitted therethrough. Additionally, a lens 822 can be further provided in front of the opening 621 of the front cover 62 to reinforce the protection of the laser module 30 and the illuminator module 50, and to enhance the laser beam emitted from the laser sight.

The switch set 70 is connected to the rear or proximal end of the power source 20 and has a rear cover 72 connected to a switch 74 by a signal line 745, with a PC board 76 secured inside the rear cover 72. The PC board 76 is electrically connected to the battery 24 and the conducting tube 26 in the power source 20 via a rear conducting spring 78 and a conducting pressing loop 724, with an insulating loop 722 inserted between the conducting pressing loop 724 and the rear cover 72 to insulate the loop 722 from the hollow cylinder 22. Therefore, the signal of the switch 74 may be transmitted to the PC board 76 through the signal line 745, and the switch 74 can be used to control the laser sight in any of the following manners: (1) switching on or off the laser module 30 only; (2) switching on or off the illuminator module 50 only; or (3) switching the laser module 30 and illuminator module 50 on or off, simultaneously.

Since the center of the illuminator module 50 is aligned with light exit of the laser diode 32, and the LEDs 52 are coaxial with the laser sight line, the target can be illuminated while at the same time avoiding deviation between the illumination and the laser sight point when a shooter is moving the sight point. As a result, the high illumination LEDs 52 are oriented in an annular manner around the central bore 542 and can offer a light supplement effect with uniform illumination, enabling the shooter to see the profile of the target clearly so as not to misjudge a target owing to any shadow caused by uneven illumination. In addition, all functions of the laser sight can be operated by pressing only one switch 74, so that the laser sight of the present invention can be operated consistently and effectively.

To facilitate use in all types of weather, the laser sight of the present invention can provide an O-ring 824 that can be installed between the front cover 62 and the lens 822, and a waterproof front cover 82 may further cover the front end of the front cover 62. In addition, O-rings 84, 86 and 88 may further be installed between the front cover 62 and the adjusting drum 42, between the adjusting drum 42 and the cylinder 22, and between the cylinder 22 and the rear cover 72. Corresponding waterproof bolt covers 85 and O-rings 852 can also be provided outside the adjusting bolts 44. Thus, the O-rings 824, 84, 86, 88, 852 and the covers 82 and 85 function to keep the inside of the laser sight dry from external water and sweat.

What is claimed is:

1. An illuminable laser sight, comprising:
   a power source;
   a laser module coupled to the power source, the laser module having a laser diode for emitting laser beams;
   an adjuster module positioned around the laser module and coupled to the power source, the adjuster module having a front face and a laser light exit formed at the center of the front face and aligned with the laser diode; and
   an illuminator module positioned adjacent the front face of the adjuster module, the illuminator module having a plurality of LEDs arranged in an annular manner to define a central bore that is axially aligned with the laser light exit and the laser diode, with the LEDs emitting light that is axially aligned in the same direction as the laser beam.

2. The sight of claim 1, wherein said laser module further comprises a laser cover positioned around the laser diode to protect the laser diode.

3. The sight of claim 1, wherein the laser module is electrically connected to the power source via a central conducting spring and an outer conducting spring.

4. The sight of claim 1, wherein the power source further includes a cylinder for retaining a battery, and a conducting tube installed inside the cylinder to conduct electricity.

5. The sight of claim 4, wherein the power source further includes a front sleeve and a rear sleeve covering a front end and rear end of the cylinder and the conducting tube, respectively.

6. The sight of claim 1, further including a switch set coupled to the power source to switch on and off the laser sight and to select illumination and/or sighting.

7. The sight of claim 1, wherein the illuminator module further includes a PC board which supports the annular LEDs, with the central bore extending through the PC board.

8. An illuminable laser sight, comprising:
   a power source;
   a laser module coupled to the power source, the laser module having a laser diode for emitting laser beams;
   an adjuster module positioned around the laser module and coupled to the power source, the adjuster module having a front face and a laser light exit formed at the center of the front face and aligned with the laser diode; and
   an illuminator module positioned adjacent the front face of the adjuster module, the illuminator module having a plurality of LEDs arranged in an annular manner to define a central bore that is axially aligned with the laser light exit and the laser diode;
   wherein the adjuster module comprises an adjusting drum, a plurality of adjusting bolts spaced apart around the adjusting drum and contacting the laser module, and a plurality of corresponding springs, each spring provided opposite to one of a corresponding adjusting bolt.

9. The sight of claim 8, wherein each spring is fixed in the adjusting drum by a corresponding spring cover.

10. The sight of claim 8, wherein the adjusting bolts are separated by 90° around the adjusting drum.

11. The sight of claim 8, further including a front cover covering the front face of the adjuster module and having an opening aligned with the central bore and laser light exit for exiting light from the laser diode and the illuminator module.

12. An illuminable laser sight, comprising:

a power source;

a laser module coupled to the power source, the laser module having a laser diode for emitting laser beams;

an adjuster module positioned around the laser module and coupled to the power source, the adjuster module having a front face and a laser light exit formed at the center of the front face and aligned with the laser diode; and an illuminator module positioned adjacent the front face of the adjuster module, the illuminator module having a plurality of LEDs arranged in an annular manner to define a central bore that is axially aligned with the laser light exit and the laser diode;

wherein the illuminator module further includes a conducting spring plate and a spring plate stand, with the spring plate stand supported by the adjuster module, and the conducting spring plate fixed on the spring plate stand, with the LEDs electrically coupled to the power source and the conducting spring plate.

13. The sight of claim 6, wherein the switch set includes a rear cover, a signal line and a switch, wherein the rear cover electrically couples the power source with the switch via the signal line.

14. The sight of claim 13, wherein a rear conducting spring and a conducting pressing loop are further installed inside the rear cover to be electrically coupled with the power source.

15. The sight of claim 14, wherein an insulating loop is installed outside the conducting pressing loop.

16. The sight of claim 13, wherein the switch functions to switch on the laser diode alone, the LEDs alone, or the laser diode and LEDs simultaneously.

17. The sight of claim 1, further including a front cover and a lens disposed inside the front cover.

18. The sight of claim 5, further including a waterproof cover and a first O-ring provided between the front cover and the waterproof cover.

19. The sight of claim 18, further including a second O-ring provided between the front cover and the adjuster module, and a third O-ring provided between the adjuster module and the power source.

20. The sight of claim 18, further including an O-ring and bolt cover that together combine to shield and protect each adjusting bolt.

* * * * *